(12) United States Patent
Dejene

(10) Patent No.: US 10,701,305 B2
(45) Date of Patent: Jun. 30, 2020

(54) VIDEO SIGNATURE SYSTEM AND METHOD

(71) Applicant: Kebron G. Dejene, Campbell, CA (US)

(72) Inventor: Kebron G. Dejene, Campbell, CA (US)

(*) Notice: Subject to any disclaimer, the term of this patent is extended or adjusted under 35 U.S.C. 154(b) by 619 days.

(21) Appl. No.: 14/803,031

(22) Filed: Jul. 18, 2015

(65) Prior Publication Data

US 2015/0334339 A1 Nov. 19, 2015

Related U.S. Application Data

(63) Continuation-in-part of application No. 14/168,371, filed on Jan. 30, 2014.

(60) Provisional application No. 61/758,513, filed on Jan. 30, 2013.

(51) Int. Cl.
| H04N 5/76 | (2006.01) |
| G06Q 50/18 | (2012.01) |
| G06F 21/64 | (2013.01) |
| G06Q 10/10 | (2012.01) |
| H04L 9/32 | (2006.01) |

(52) U.S. Cl.
CPC ............ H04N 5/76 (2013.01); G06F 21/64 (2013.01); G06Q 10/10 (2013.01); G06Q 50/182 (2013.01); H04L 9/3231 (2013.01); H04L 9/3247 (2013.01)

(58) Field of Classification Search
CPC ........ H04N 5/76; G06Q 10/10; G06Q 50/182; H04L 9/3231; H04L 9/3247; G06F 21/64
USPC ........................................ 705/309, 317, 342
See application file for complete search history.

(56) References Cited

U.S. PATENT DOCUMENTS

| 5,623,690 | A  | * | 4/1997 | Palmer | G06F 3/04847 348/E7.081 |
| 6,553,494 | B1 | * | 4/2003 | Glass | G06F 21/32 713/176 |
| 8,494,234 | B1 | * | 7/2013 | Bozinovic | G06K 9/00744 382/103 |
| 2002/0012445 | A1 | * | 1/2002 | Perry | G06Q 10/00 382/100 |
| 2003/0023435 | A1 | * | 1/2003 | Josephson | G10L 15/26 704/235 |
| 2003/0070072 | A1 | * | 4/2003 | Nassiri | H04L 9/32 713/168 |
| 2004/0006553 | A1 | * | 1/2004 | de Vries | G06F 19/3425 |
| 2004/0143841 | A1 | * | 7/2004 | Wang | G06Q 30/02 725/32 |
| 2004/0153649 | A1 | * | 8/2004 | Rhoads | G06F 17/241 713/176 |
| 2005/0024682 | A1 | * | 2/2005 | Hull | G06F 17/30017 358/1.18 |

(Continued)

FOREIGN PATENT DOCUMENTS

| WO | WO-2010111315 A1 | * | 9/2010 | ......... G06F 16/9537 |
| WO | WO-2012174515 A1 | * | 12/2012 | ............. G10L 15/22 |

OTHER PUBLICATIONS

N.L. Clarke, Authenticating mobile phone users using keystroke analysis, Jan. 2007, International Journal of Information Security 6.1:1. Springer Science & Business Media. (Year: 2007).*

(Continued)

*Primary Examiner* — Tan D Nguyen
(74) *Attorney, Agent, or Firm* — Nwamu, P.C.

(57) ABSTRACT

A video signature system and method. A unique identifier for an agreement document is generated. Consecutive video frames with the unique identifier are captured for each party to the agreement.

16 Claims, 8 Drawing Sheets

(56) References Cited

U.S. PATENT DOCUMENTS

| | | | |
|---|---|---|---|
| 2005/0036651 A1* | 2/2005 | Wen | G06T 1/0028 382/100 |
| 2005/0044571 A1* | 2/2005 | Goldman | H04N 5/44543 725/51 |
| 2005/0226473 A1* | 10/2005 | Ramesh | G06F 21/64 382/119 |
| 2005/0259819 A1* | 11/2005 | Oomen | G10L 25/48 380/200 |
| 2007/0028111 A1* | 2/2007 | Covely | G06F 21/51 713/176 |
| 2007/0239802 A1* | 10/2007 | Razdow | G06F 17/2288 |
| 2008/0028455 A1* | 1/2008 | Hatter | G06F 21/305 726/10 |
| 2008/0137749 A1* | 6/2008 | Tian | G06T 1/0021 375/240.19 |
| 2009/0216707 A1* | 8/2009 | Keohane | G06F 11/3409 |
| 2009/0282433 A1* | 11/2009 | Petta | G06Q 30/02 725/32 |
| 2009/0287837 A1* | 11/2009 | Felsher | G06F 19/322 709/229 |
| 2010/0037062 A1* | 2/2010 | Carney | H04L 9/3247 713/176 |
| 2010/0293190 A1* | 11/2010 | Kaiser | G06F 3/048 707/769 |
| 2011/0106557 A1* | 5/2011 | Gazula | G06Q 10/10 705/3 |
| 2012/0069131 A1* | 3/2012 | Abelow | G06Q 10/067 348/14.01 |
| 2013/0039633 A1* | 2/2013 | Wong | H04N 9/8205 386/224 |
| 2013/0047074 A1* | 2/2013 | Vestergaard | G06F 3/14 715/234 |
| 2013/0311859 A1* | 11/2013 | Mahajan | G06F 17/30817 715/203 |
| 2013/0325728 A1* | 12/2013 | Bialostok | G06Q 50/18 705/311 |
| 2014/0110473 A1* | 4/2014 | Zhou | G06F 17/30879 235/375 |
| 2016/0051168 A1* | 2/2016 | Kamali | A61B 5/1123 600/595 |

OTHER PUBLICATIONS

Dialogs Searches, pp. 1-52. (Year: 2007).*

* cited by examiner

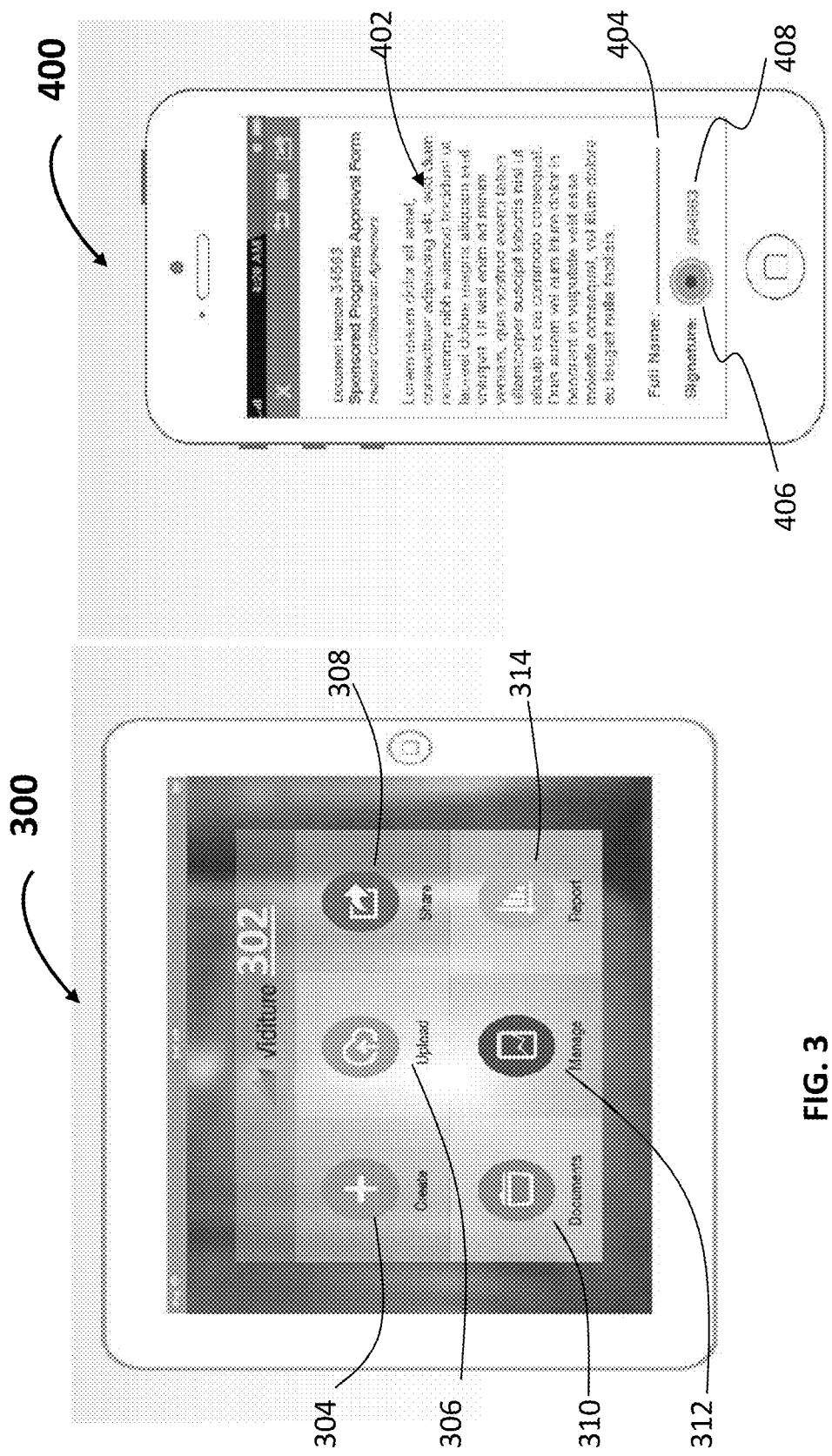

VIDEO SIGNATURE SYSTEM AND METHOD

CROSS REFERENCE TO RELATED APPLICATIONS

The present invention is a continuation-in-part of U.S. patent application Ser. No. 14/168,371, entitled Video Signatures System and Method filed Jan. 30, 2014, which claims priority from U.S. Provisional Application No. 61/758,513 entitled Green Firma, filed Jan. 30, 2013, all of which are hereby incorporated by reference as if fully set forth in the present specification.

A computer program listing appendix is provided via EFS with this application, the appendix including the following files: VideoAnnotationStamper.txt; PdfDocumentUtil.txt; ImageAnnotationStamper.txt; VideoAppender.txt; DocumentStamper.txt; DocumentMergerImpl.txt. The information is hereby incorporated by reference as if set forth in full in this application for all purposes. A portion of the disclosure recited in this application contains material which is subject to copyright protection. Specifically, the computer program listing appendix and possibly other portions of the application may recite or contain source code, data or other functional text. The copyright owner has no objection to the facsimile reproduction of the functional text; otherwise all copyright rights are reserved.

BACKGROUND OF THE INVENTION

The present invention relates generally to communication systems and methods and more specifically to communication systems and methods for executing agreements.

Agreements between parties that recite the obligations of each party become binding once the agreement is executed by all of the parties involved. Each party typically signs the agreement in an area reserved for that party's signature after which the agreement is final.

It is not uncommon, however, for a party to repudiate the agreement. That is, one or more parties can claim that they never executed or signed the agreement in question. If this happens, the non-repudiating party must attempt to prove that the repudiating party did sign the agreement.

This process can be difficult as the non-repudiating party must attempt to show that the signature of the repudiating party is shown on the document. Signature analysis might be used in this respect, or the repudiating party's signature on the document can be compared to other known signatures of the repudiating party.

The non-repudiating party might also attempt to introduce secondary evidence to show that the repudiating party did sign the agreement. This might include evidence of discussions that led up to the execution of the agreement. Nevertheless, even after undergoing the process of attempting to establish that the repudiating party did sign the agreement, the non-repudiating party may still be unsuccessful in proving that the signature on the document belongs to the repudiating party.

It is within the aforementioned context that a need for the present invention has arisen. Thus, there is a need to address one or more of the foregoing disadvantages of conventional systems and methods, and the present invention meets this need.

BRIEF SUMMARY OF THE INVENTION

Various aspects of a video signature system and method can be found in exemplary embodiments of the present invention.

The method is initiated when a signer's processing device receives a document data file that is capable of displaying at least plain text and/or images. The document data file includes at least one area where the signature of the signer can be appended. The method uses captured video frames of the signer to digitally sign the at least one signature area by using the processor to initiate a video capture device on a user computing device and thereafter capturing video frames of the signer verbalizing acceptance of terms of the document.

The video frames may be embedded within the document data file and/or the document data file and video frames are associated with the at least one signature area so that upon interaction with the at least one signature area, a video player plays the captured video frames to authenticate the signer's acceptance of terms of the document.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

BRIEF DESCRIPTION OF THE DRAWINGS

FIG. 3 illustrates a tablet interface according to an exemplary embodiment of the present invention.

FIG. 4 illustrates a document interface as displayed on mobile device according to an exemplary embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figure 1:
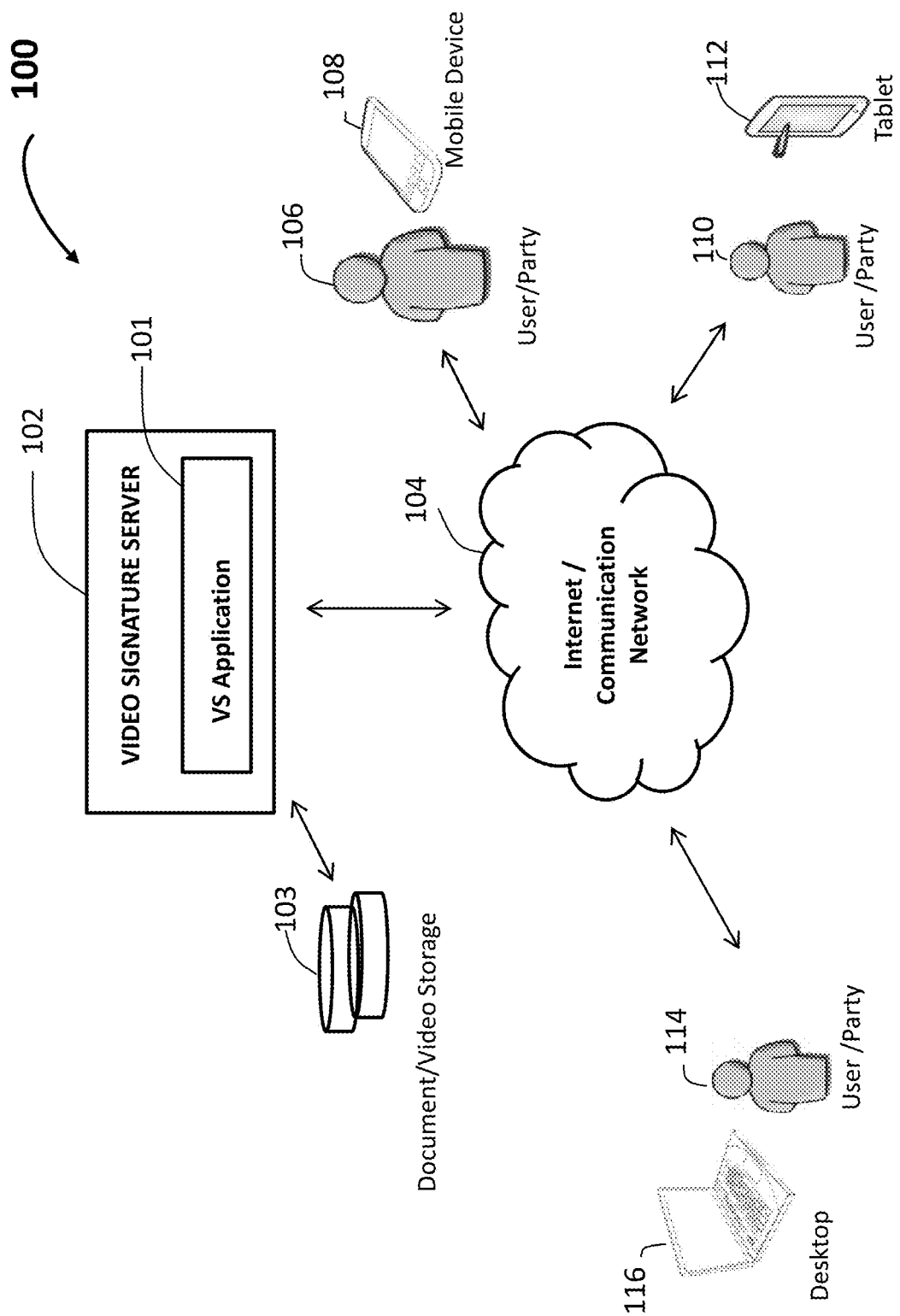
FIG. 1 illustrates a video signature communication system according to an exemplary embodiment of the present invention.

FIG. 1 illustrates video signature communication system 100 according to an exemplary embodiment of the present invention.

In FIG. 1, among other components, video signature communication system 100 comprises video signature server 102 communicably coupled to user/party 106 via Internet/communication network 104. Although not shown, Internet/communication network 104 represents any distributed network (wired, wireless or otherwise) for data transmission and receipt between two points. The system of the present invention can work effectively with any possible distribution of interconnected processors regardless of the specific topology, hardware and protocols used.

Here, user/party 106 represents a person, entity or party that intends to execute an agreement with another party. For example, user/party 106 might be a board member that needs to ratify a board decision by signing a document relating to that decision.

As another example, user/party 106 can be a doctor that needs a waiver signed in order for him or her to operate on a child. Although not illustrated, other users or parties or entity types are contemplated by the present invention so long as such users or entities wish to execute an agreement either unilaterally or in collaboration with other parties.

In FIG. 1, user/party 106 can utilize mobile device 108 to review documents, manipulate documents and transfer documents to video signature server 102 either for storage on document/video storage database 103 communicably coupled to video signature server 102. Document/video storage 103 can be any suitable database storage system. For example, document/video storage 103 can be MongoDB, a NoSQL, non-relational, next-generation operational datastore; or it might be a traditional RDBMS such as those available from Oracle, Inc.

Here, mobile device 108 might be an iPhone™ based on the iOS platform. As another example, mobile device 108 can be based on the Android™ platform. Preferably, mobile device 108 includes a video capture device and a video player.

In one embodiment, mobile device 108 might include browser 207 (FIG. 2) for communication HTTP requests to video signature server 102. In an alternate embodiment, mobile device 108 can download an app Client VS Application 207 (FIG. 2) also configured to communicate with video signature server 102 (and VS Application 101). In either case, preferably most of the processing required by the present invention may be executed by video signature server 102. Although not shown, all other such future mobile communication devices are also contemplated by those of ordinary skill in the art to be within the confines of the present invention.

Here, video signature server 102 might be web/application server, a combination of processors and/or software, preferably Apache, which among other functionalities can host a website (not shown). Video server 102 might include VS Application 101 that coordinates with video signature 102 to respond to HTTP requests from mobile device 108 and can provide for downloading of various components including a video signature app (not shown), in one embodiment, and video player 212 (FIG. 2)) by mobile device 108 in accordance with the principles and precepts of the present invention.

VS Application 101 can also allow access to documents that are either executed or yet to be executed that are stored by document/video storage 103. VS Application 101 may be based on any suitable programming language, preferably JAVA, with JQuery and Twitter Bootstrap for the User Interface. Video signature server 102 might also execute various processes to implement principles and precepts of the present invention upon request by user/party 106 via mobile device 108.

In FIG. 1, video signature communication system 100 further comprises user/party 110 also communicably coupled to video signature server 102 via Internet/communication network 104. Here, user/party 110 might be another board member that needs to ratify a decision in collaboration with user/party 106.

User/party 110 might be located in a region that is geographically remote from user/party 106, and thus, documents may need to be exchanged and transferred between user/party 110 and user/party 106. As another example, user/party 110 might be a parent of a patient that needs an operation. User/party 110 may need to execute or sign a waiver from a doctor in order for an operation to proceed on user/party 110's child.

User/party 110 can utilize tablet 112 to communicate with video signature server 102 as well as user/party 106. Preferably, tablet 112 includes a video capture device and a video player. Tablet 112 may also include a browser and/or app configured to communicate with video signature server 102. Tablet 112 can be any known communication device that includes a processor for executing software routines in accordance with principles and precepts of the present invention.

In FIG. 1, video signature communication system 100 also includes user/party 114 who might also be a party to an agreement executed by user/party 106 as well as user/party 110. User/party 114 might be a third board member that also needs to ratify a decision that has been made by the entire board that includes user/party 106 and user/party 110.

User/party 114 can utilize desktop 116 for communication with the other parties as well as with video signature server 102. Preferably, desktop 116 includes a video capture device and a video player. Desktop 116 includes a browser and/or app configured to communicate with video signature server 102. Again, desktop 116 can be any traditional desktop that includes a processor, memory and input/output devices.

Briefly, in use, user/party 106 may wish to execute an agreement among multiple parties including user/party 110 and user/party 114, all of whom may be located in geographically distant regions. User/party 106 uses mobile device 108 to view agreement and to capture consecutive video frames of user/party 106 for association with each agreement document. In one embodiment, the captured video frames and document are retained locally for forwarding to other parties. In an alternative embodiment, the captured video frames and document are communicated to video signature server 102 for storage and access by user/party 110.

Upon review of the document, user/party 110 also utilizes tablet 112 to capture consecutive video frames while user/party 114 uses desktop 116 to capture consecutive video frames for association with the agreement document. Other aspects of the present invention will be illustrated with reference to FIGS. 2 through 8.

Figure 2:
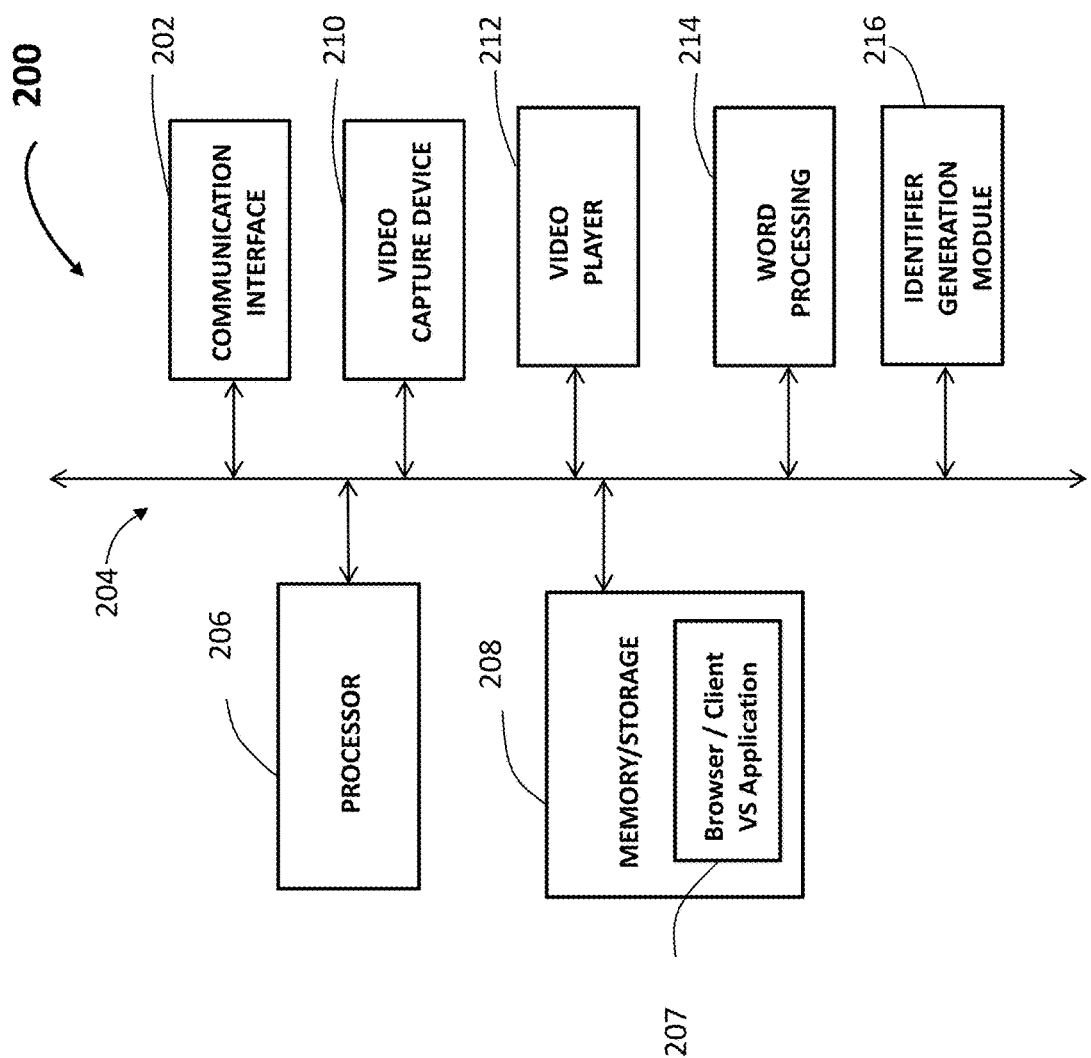
FIG. 2 illustrates a client system showing components of a mobile device, tablet or desktop according to an exemplary embodiment of the present invention.

FIG. 2 illustrates client system 200 showing components of mobile device 108 (or tablet 112 or desktop 116) according to an exemplary embodiment of the present invention.

In FIG. 2, client system 200 facilitates creation or retrieval of agreement documents and the capture of consecutive video frames for association with said an agreement document. Client system 200 includes processor 206 and communication interface 202 that interfaces via system bus 204. Processor 206 coordinates system operations and directs communication interface 202 to transmit and receive data from signature video server 102.

Communication interface 202 can be any suitable communication interface that allows data transfer from the system as well as to the system. Client system 200 also includes video capture device 210 such as a camera and video player 212. Video player 212 can be software downloadable from video signature server 102/VS Application 101 or that exists as part of mobile device 108 for playback of consecutive video frames captured in accordance with the present invention.

Client system 200 also includes word processing module 214 and identifier generation module 216. Word processing module 214 can be any known word processor for manipulating text and creating documents. Each document created is configured such that one or more signature block areas are created where parties can execute the agreement with their signatures.

Identifier generation module 216 can be software or hardware that generates identifiers associated with agreements in accordance with the present invention. In one embodiment, identifiers are based on a hash of the document that provides a unique identifier that can only be produced by the document.

After each document is created, identifier generation module 216 is automatically initiated to generate a unique identifier for the document. If the document is in existence, the identifier generation module 216 is initiated by saving the document.

Client system 200 also includes memory/storage 208 which can be any suitable memory in which programs executed by processor 206 are stored. As shown, depending on the embodiment, memory/storage includes browser or client VS application 207. Browser 207 preferably uses RecordRTC (https://www.webrtc-experiment.com/RecordRTC/) to capture consecutive audio and video frames for transfer to video signature server 102.

FIG. 3 illustrates tablet interface 300 of tablet 112 (FIG. 1) according to an exemplary embodiment of the present invention.

In FIG. 3, tablet interface 300 displays viditure application 302 for implementing video signature in accordance with the present invention. The inventors have named this invention "viditure" defined as the capability to utilize consecutive video frames (and audio frames) of a user to execute documents.

As can be seen, in FIG. 3, viditure application 302 includes create button 304 and upload button 306. Create button 304 may be used to initiate word processing module 214 (FIG. 2) in order to create or to review documents that need to be executed or that have been executed with the requisite signatures. Upload button 306, as implied by its name, can upload documents to video signature server 102 for storage and/or transmission to other parties that are party to an agreement.

Tablet interface 300 also includes share button 308 and documents button 310 that can be selected to show documents either locally on the client or that have been transferred to video signature server 102. Share button 308 allows user/party 106 to share documents and corresponding consecutive video frames. Manage button 312 permits documents and video frames stored locally while report button 314 enables user/party 106 to generate requisite reports.

FIG. 4 illustrates document interface 400 as displayed on mobile device 108 according to an exemplary embodiment of the present invention.

In FIG. 4, as shown, text 402 showing terms of the agreement has been displayed. User/party 106 can execute this agreement by entering his or her name at signature block 404 and then selecting video sign button 406 that initiates capturing of consecutive video frames as shown with reference to FIGS. 5 and 6.

Figures 5, 6:
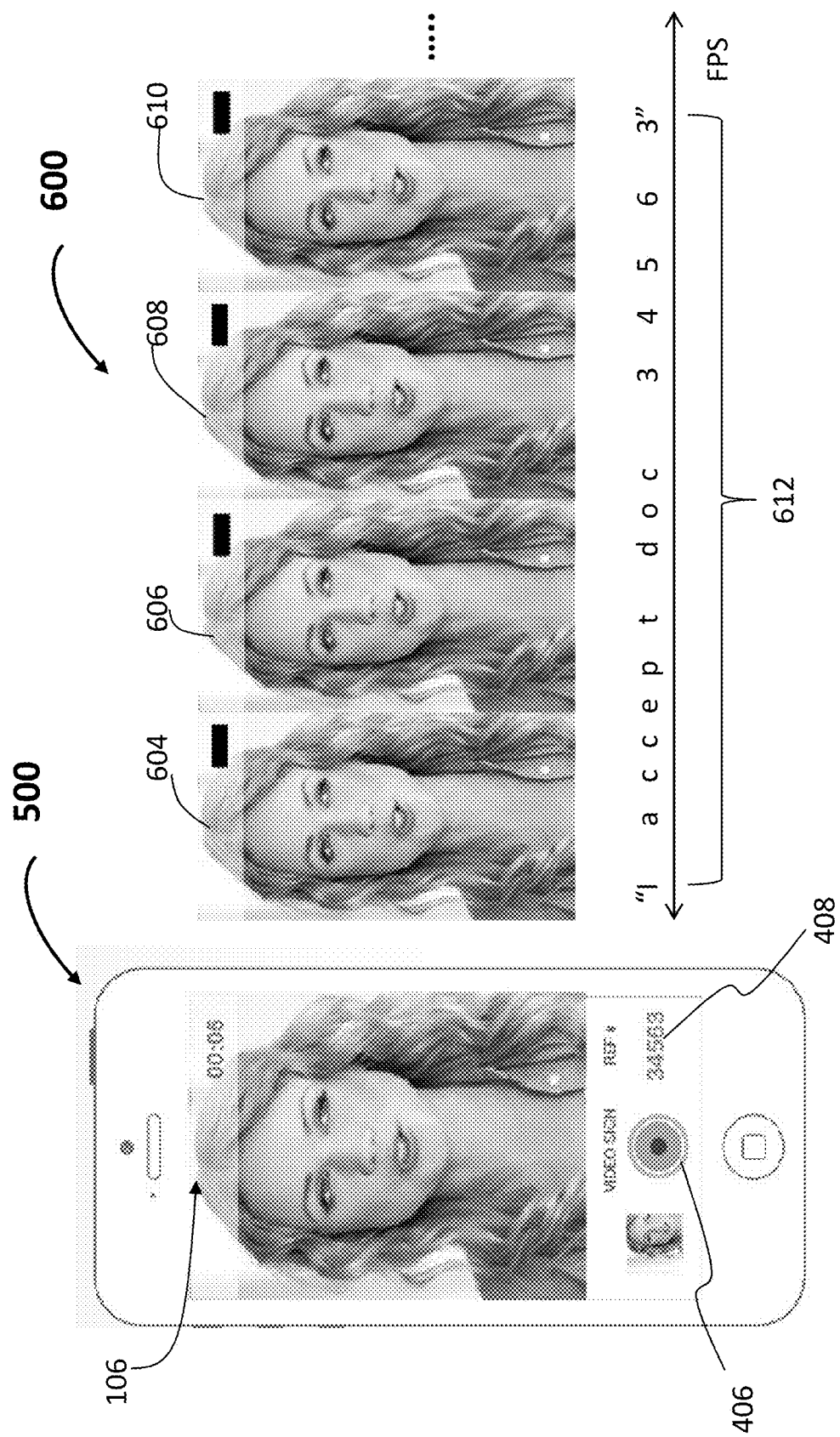
FIG. 5 illustrates a mobile device interface as displayed on the mobile device of FIG. 1 according to an exemplary embodiment of the present invention.
FIG. 6 illustrates consecutive video frames according to an exemplary embodiment of the present invention.

FIG. 5 illustrates mobile device interface 500 as displayed on mobile device 108 according to an exemplary embodiment of the present invention.

In FIG. 5, mobile device interface 500 shows user/party 106 during a consecutive video frame and audio capture process. Here, user/party 106 has selected video sign button 406 in order to begin capturing consecutive video frames of herself for a document uniquely identified as 34563 as shown at 408.

Upon selecting video sign button 406, video capture device 210 (FIG. 2) is initiated. As can be seen in FIG. 6, consecutive video frames 604, 606, 608, 610 are captured by video capture device 210. Consecutive video frames 604, 606, 608 and 610 specifically capture user/party 106 verbalizing the words, "I accept document 34563" 612. The captured consecutive video frames and audio are then passed to browser/client VS application 207 (FIG. 2).

The captured consecutive video frames are also associated with unique numeric (or alphanumeric) identifier 34563. By associating, it is meant that retrieving or opening the document having identifier 34563 also retrieves or provides the ability to playback consecutive video frames 604, 606, 608 and 610.

In one embodiment, consecutive video frames 604, 606, 608 and 610 or its corresponding video file are embedded in signature block 404 area. In this manner, the consecutive video frames (and audio) can be played back by selecting or interacting with the signature block 404 area to display party/user 106 verbalizing the statement "I accept document 34563." Although not shown, note that a timestamp indicating when the video frames were captured and geolocation of parties are captured as well.

Figure 6A:
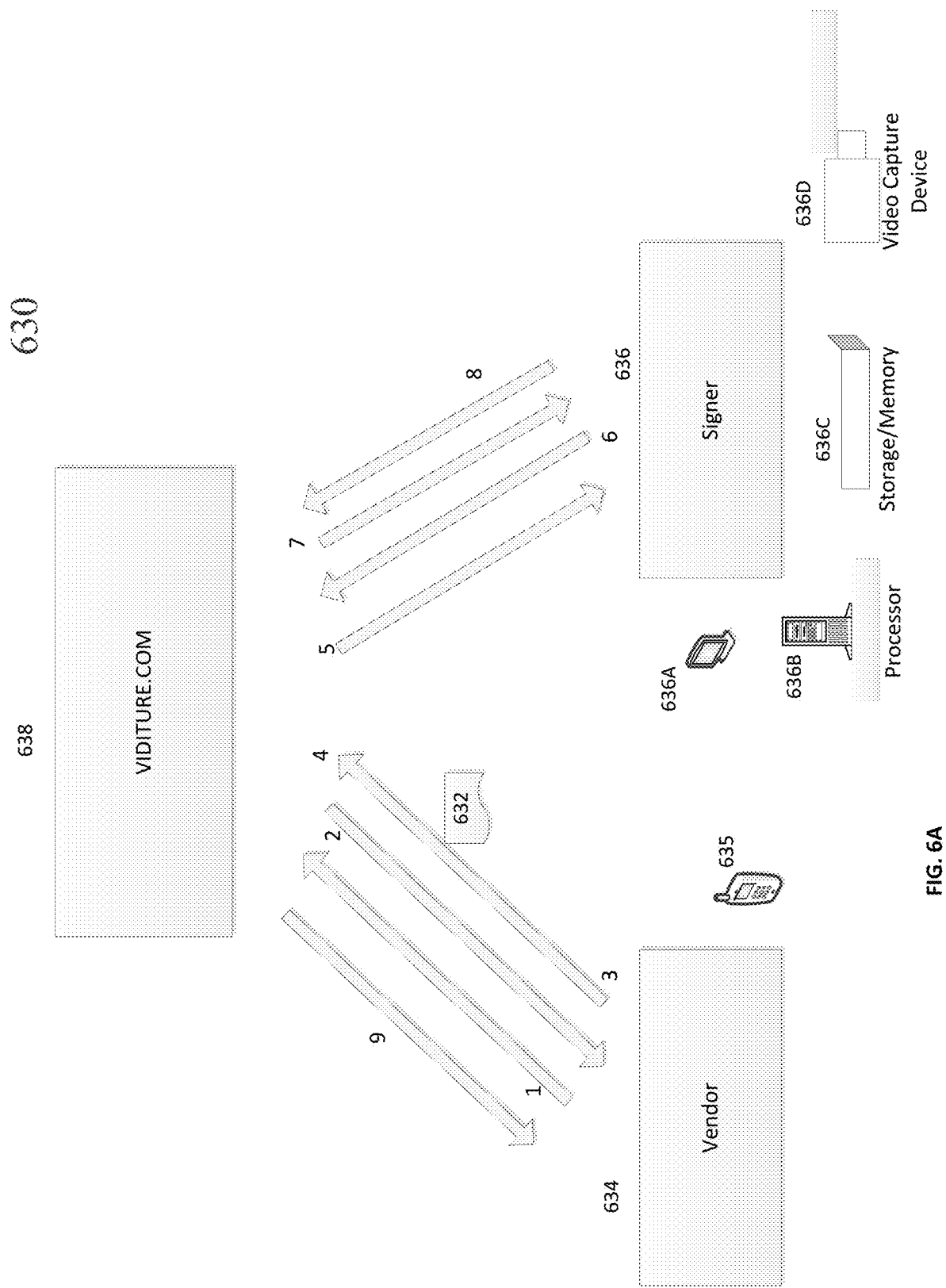
FIG. 6A illustrates a video signature communication system and execution of a digital signature in accordance with another exemplary embodiment of the present invention.

FIG. 6A illustrates video signature communication system 630 and execution of a digital signature in accordance with another exemplary embodiment of the present invention.

In the implementation of FIG. 6A, video signature communication system 630 facilitates embedding of digital video signatures in data files that are configured to display plain text. Specifically, in FIG. 6A, video signature communication system 630 embeds signer video signatures into plain-text-data-file sales agreement 632 to authenticate such signers and signed documents.

Here, vendor 634 might be a seller of widgets that has negotiated with a buyer or signer 636 for the buyer to purchase a shipment of widgets. The buyer or signer 636 is remotely located from vendor 634 and cannot sign the purchase agreement contemporaneously in the presence of vendor 634.

And thus, without the advantages of the present invention, if signer 636 were to electronically sign the purchase agreement, vendor 634 cannot authenticate signer 636's signature and will always remain uncertain as to whether signer 636 did sign the document or whether there was indeed a "man-in-the-middle" attack. Thus, the purchase agreement may be repudiated by signer 636 in the future.

An advantage of an embodiment of the present invention is that it uses captured video frames of the signer to digitally sign one or more predetermined areas of the purchase agreement of similar type data files. The signer cannot later repudiate the agreement which now incorporates the signer's captured video frames. The present invention straightforward, simple and devoid of complexity.

Although it can be utilized, public key infrastructure and distribution of public and private keys are not needed. Nor is a third-party certification authority needed. Another advantage is that an embodiment of the present invention can be employed in lieu of a notary. In the United States, notary publics are persons authorized to perform certain legal formalities, especially to draw up contracts and witness the parties sign contractual agreements. An embodiment of the present invention renders the need for such notary publics redundant because captured video signatures of signers are embedded into executed documents.

In FIG. 6A, as stated, vendor 634 and signer 636 have entered into a contractual represented by sales agreement 632. Vendor 634 now wishes for signer 636 to execute the agreement. After a registration process, vendor 634 begins by transmitting the unexecuted sales agreement 632 to viditure.com 638.

Specifically, vendor 634 uses computing device 635 to upload sales agreement 632 to viditure.com 638 as shown in step 3. Although not shown, computing device 635 includes processor, memory and a browser or viditure app downloaded from viditure.com 638. The browser or viditure app, in one embodiment, is directed by the processor to interpret and execute JAVA programming commands to implement various aspects of the present invention.

The appendix of the present invention includes exemplary software code for implementing aspects of the present invention. One skilled in the art will realize that the software modules are exemplary and that type programming languages, code or modules can be used for the present invention without departing from the scope and spirit of the present invention.

Referring to FIG. 6A, at step 1, prior to uploading the unexecuted sales agreement 632, vendor 634 begins by sending a registration request to viditure.com 638. In an embodiment, viditure.com includes one or more web servers/application servers and databases to facilitate embedding of video signatures and communication of documents between its subscribers/users. Membership may be offered on a fee-basis to subscribers that wish to utilize its video signature embedding services.

At step 2, viditure.com 636 transmits all logon and authentication credentials to vendor 634. Vendor 634 uses the credentials to login to viditure.com.

At step 3, vendor 634 uses a browser or viditure app on computing device 635 to attach the unexecuted sales agreement 632 for uploading to viditure.com 638. Here, sales agreement 632 is preferably a PDF file but may be a Microsoft Word™ document, and other such data files configured to display plaintext information.

At step 4, the transmitted sales agreement 632 is received by viditure.com 638. In turn, viditure.com 638 parses the document to locate and tag one or more predetermined areas of the data file where a signer's initial and/or signatures will be located.

Preferably, the predetermined area is a signature block area located at the end of the document. Other predetermined areas for receiving signer initials and signatures can be anywhere within the four corners of the document.

At step 5, after parsing and tagging sales agreement 632, viditure.com 638 then communicates a document availability notice to signer 636. The document availability notice informs signer 636 that sales agreement 632 from vendor 634 is available for execution. Preferably, the notice may be delivered via electronic mail having a link that can be selected to access sales agreement 632.

At step 6, signer 636 receives the document availability notice and the document link. Signer 636 selects the document link to request download of sales agreement 632 from viditure.com 638. Here, if signer 636 is unregistered with viditure.com, signer 636 may be prompted to register by providing all of his or her requisite registration information. Alternatively or in addition to being asked to register, signer 636 may be prompted to agree with viditure.com disclosures and polices before proceeding.

At step 7, the unexecuted sales agreement 632 is transmitted from viditure.com 638 to signer 636 for viewing and execution. Here, signer 636 employs a computing device such as a mobile device or the like that includes display device 636A, processor 636B, storage/memory 636C and video capture device 636C. Upon receipt by signer 636 of sales agreement 632, processor 636B uses a browser or viditure app (not shown) to display sales agreement 632 on display device 636A for viewing by signer 636.

Signer 636 can scroll through and read the entirety of sales agreement 632 to ensure that signer 636 agrees with the document terms. As noted, sales agreement 632 can be any data file configured to display plain text for viewing by a user. Preferably the document is a PDF file displayed within a browser, however, the document be word processing application, TIFF file, etc.

After viewing sales agreement 632, if signer 636 is in agreement with the document, he or she then initiates use of captured video frames of signer 636 to digitally sign one or more predetermined areas of the sales agreement 632 data file. Specifically, signer 636 employs processor 636B to activate video capture device 636 on the user computing device.

More specifically, in one embodiment, when signer 636 reaches the predetermined area or signature block wherein signer 636's signature is to be appended, signer 636 selects a "start recording button" located proximate to the predetermined area or signature block. Note here that in one embodiment, the "start recording button" is appended onto sales agreement 632 during the parsing and tagging process at viditure.com 638.

In an alternate embodiment, the parsing and tagging process may be controlled locally by processor 636B of signer 636. By "tagging" it is meant that fields for signatures are created and/or post It™ type "sign here" tags are appended to the predetermined areas or signature blocks in sales agreement 632. By "predetermined" it is meant that specific areas where signatures would be appended are established (typically but not necessarily by vendor 634) ahead of time, at specific locations in the document, before the sales agreement is executed by signer 636.

As noted above, the "start recording button" is appended onto sales agreement 632 during the parsing and tagging process at viditure.com 638.

After the "start recording button" is selected, video capture device 636D begins to capture a plurality of video frames of the signer 636 verbalizing acceptance of terms of the document. For example, signer 636 may state "I accept terms of document 1234567".

In one embodiment, signer 636 is given a predetermined duration such as 8 seconds to complete verbalizing acceptance. If acceptance is not completed within the period, video capture device 636D is deactivated. In another embodiment, no predetermined duration is provided, although without a predetermined duration, the file size of the captured image may be too large.

In one embodiment, a unique numeric or alphanumeric identifier that is uniquely associated with said document is generated either locally or remotely by viditure.com 638. In the example above, the unique identifier is "1234567." This identifier is verbalized by the user to accept terms of the document.

After the plurality of frames of signer 636 is captured, processor 636B stores the captured frames and sales agreement 632 in storage/memory 636C; processor 636B also associates plurality of video frames with at least one of the predetermined areas of the data file, in this case, at the area where "the start recording" button is located. A variety of digital video formats may be used for storing the plurality of video frames. For example, the frames may be stored using the MP4 format. As another example, the frames may be stored using AVI or ProRes, for example. A light weight video player for playing the stored plurality of video frames is also embedded inside sales agreement 632.

In one embodiment, a thumbnail of a frame is created and embedded into the at least one predetermined area. In a further implementation, signer 636 may also embed a copy of his or her driving license into the at least one predetermined area. In this manner, presentation of the signer 636's driving license is akin to presentation and a notary public to validate the identity of signer 636.

At step 8, sales agreement 632 now executed and the associated plurality of video files (and the driving license image depending upon the embodiment), are forwarded to viditure.com 638. Viditure.com 638 may generate a hash of sales agreement 632, which might include the unique identifier, the plurality of video frames and/or signer 636's information (e.g. the signer's name). Corresponding metadata fields for the documents and video frames may also be provided.

At step 9, executed sales agreement 632 can be downloaded and viewed by vendor 634 to validate that the document has been executed by signer 636. Specifically, as vendor 634 views sales agreement 632, the vendor can select the thumbnail embedded in the at least one predetermined area where the document is executed.

Upon selection of the thumbnail, the light weight video player is used to play the plurality of embedded video frames. Video controls such as Play, Stop, Rewind, Full screen, volume controls, etc., may be provided. In this manner, the playback of the plurality of video frames showing signer 939 verbalizing acceptance of document 632 authenticates the signer's acceptance of terms of the document.

Figure 7A:
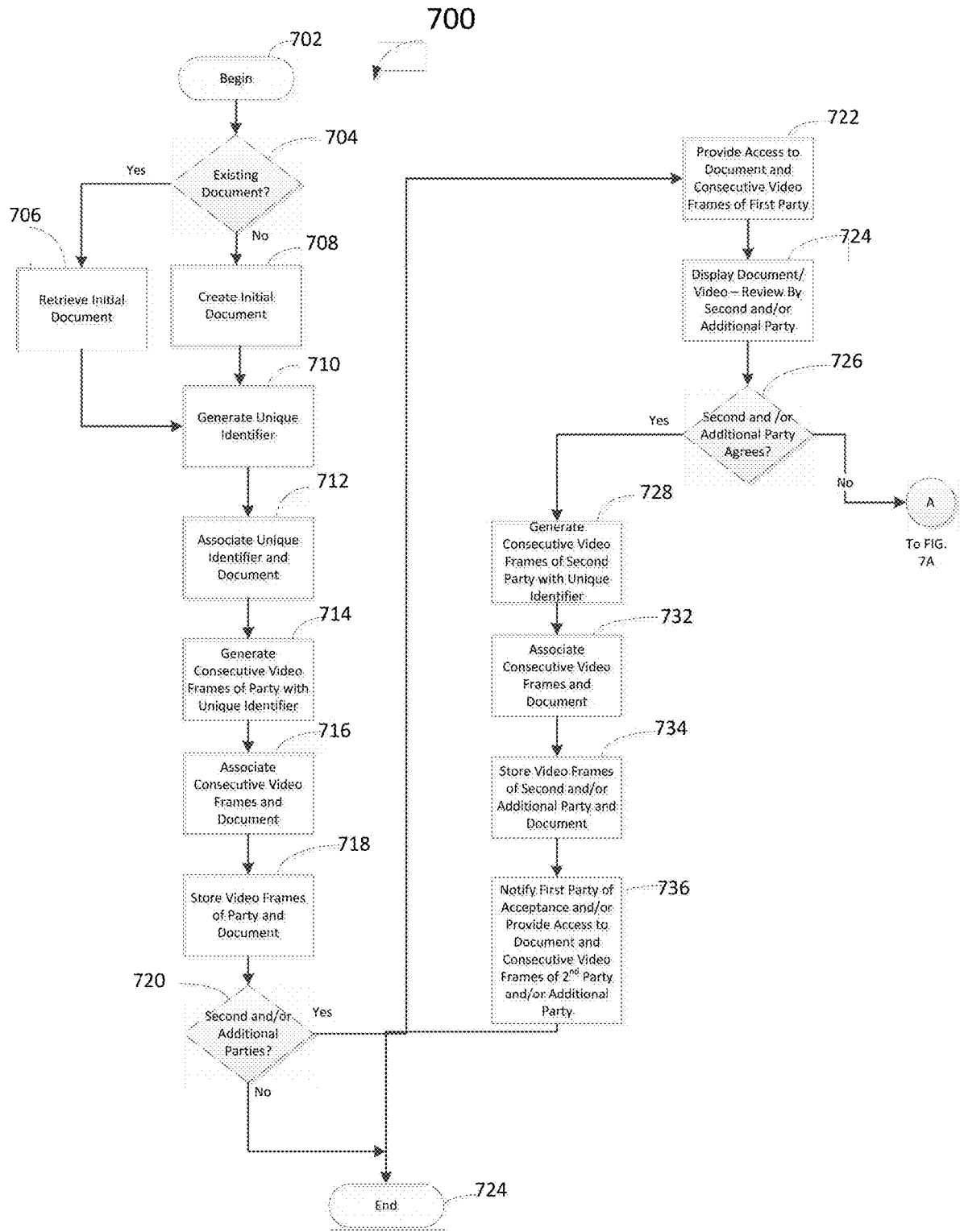
FIG. 7A illustrates a video signature method according to an exemplary embodiment of the present invention.

FIG. 7A illustrates method 700 according to an exemplary embodiment of the present invention.

In FIG. 7A, method 700 enables users and parties to utilize consecutive video frames and audio to execute agreements and in one embodiment, embed said video frames in corresponding signature blocks on the document. Consequently, each document is embedded with consecutive video frames of each party to the agreement and then thereafter stored at a designated server, namely video signature server 102, or at the client locations as determined by the operator of the present invention.

At begin block 702, method 700 is initiated.

At decision block 704, it is determined whether there is an existing document, namely, a document that needs to be executed as part of an agreement. That is, the document contains text configured into terms of an agreement as well as configured to form signature blocks for each party to the agreement.

If there is an existing document or agreement at 706, that initial document or existing document is retrieved. If there is no existing document, at 708, an initial document is created for the agreement.

Specifically, as an example, user/party 106 (FIG. 1) uses viditure application 302 (FIG. 3) on mobile device 108 to initiate word processing module 214 (FIG. 2) in order to create the document.

After the document is created or retrieved, at block 710, a unique identifier is generated for the document. In one embodiment, the unique identifier may be generated locally by identifier generation module 216. In an alternate embodiment, the unique identifier is generated by video signature server 102 and then downloaded to client mobile device 108.

At 712, the identifier is uniquely associated with the agreement document. It is noted that the identifier itself may be based on the document itself. That is the identifier may be a hash of the document so that an identifier that is uniquely associated with the document is created. By associating the identifier on the document, any reference or pointer to the identifier immediately retrieves the document.

At block 714, consecutive video frames of user/party 106 are generated. Specifically, in one embodiment, user/party 106 selects video sign button 406 (FIG. 5). Upon selecting video sign button 406, video capture device 210 (FIG. 2) is initiated. User/party 106 then begins to verbalize the unique identifier generated and that is uniquely associated with the document.

Specifically, user/party 106 indicates her assent to the terms of the agreement by vocalizing the unique identifier, and as she verbalizes the unique identifier, consecutive video frames are captured. As shown in the example of FIG. 6, video frames 604, 606, 608 and 610 capture user/party 106 as she verbalizes her acceptance of the agreement as shown at 612 (FIG. 6). Specifically, user/party 106 states, "I accept document 34563," all of which is captured by consecutive video frames 604, 606, 608 and 610.

At 716, the system associates the consecutive video frames and the document. Thus, any reference to the consecutive video frames also points to the document, and any reference to the document points to the consecutive video frames.

At 718, the consecutive video frames are stored as a video file and then stored with the document. The video file and the document may be stored locally on mobile device 108 or uploaded to video signature server 102 for storage on document/video storage database 103 and subsequent transmission to or access by other parties to the agreement.

At decision block 720, it is determined whether there are second and/or additional parties that have to execute or sign the agreement document. If yes, method 700 proceeds to block 722. If no, method 720 proceeds to 724 to end block 724, and the method is terminated. In other words, only the agreement executed by a single party, in this case, user/party 106, is captured as in the case of a check, for example, executed by a user for tender to a bank.

At block 722, since there is a second or additional party, access to the document and consecutive video frames of user/party 106 is provided. For exemplary purposes, it is assumed that the second party is user/party 110 of FIG. 1. In one embodiment, user/party 110 accesses the documents executed by user/party 106 via links sent to user/party 110.

The links are configured to provide access or to retrieve the documents from video signature server 102. In an alternate embodiment, user/party 110 can also obtain the documents executed by user/party 106 by separately logging into a website hosted by video signature server 102. In a further embodiment, user/party 106 can simply attach the executed document and the consecutive video file to an email for forwarding to user/party 110.

At block 724, user/party 110 retrieves the document and reviews the document for acceptance. That is, user/party 110 displays the document reviews, the entirety of the document to see if the user wishes to accept the agreement based on the terms displayed on the user's device.

At decision block 726, if user/party 110 agrees with the terms of the document, method 700 proceeds to block 728. Otherwise, execution proceeds to decision block 730 of FIG. 7B.

At block 728, user/party 110 uses tablet 112 (FIG. 1) to initiate video capture device 210 (FIG. 2) in order to capture consecutive video frames of user/party 110 as the user verbalizes the unique identifier associated with the agreement document. This follows a similar process as that described with reference to FIGS. 5 and 6.

At block 732, the consecutive video frames now starting a file are associated with the document. In other words, reference to the consecutive video files of user/party 110 verbalizing the unique identifier to indicate agreement with the terms of the document, acts as a pointer to the document and vice versa.

Note that initiation or interaction with the specific signature block designated for user/party 110 on the document initiates playback of the consecutive video files captured for user/party 110. (Interaction with a specific signature block designated for user/party 106 also initiates playback for video frames captured for user/party 106.)

At block 734, the video frames for user/party 110 are stored.

At block 736, user/party 106 is notified of the acceptance of user/party 110 and/or access is provided to user/party 106 to the recorded consecutive video frames as stored with or embedded within the document. The method then proceeds to end block 734.

At this point, user/party 110 and user/party 106 have indicated their acceptance by capturing consecutive video frames of themselves viditurizing their video signatures which in one embodiment are embedded in respective signature blocks for each party or otherwise associated with the document. In this manner, parties cannot repudiate the fact that they executed the agreement document since consecutive video frames of each party vocalizing or verbalizing their acceptance of the document based on the unique identifier for the document.

Figure 7B:
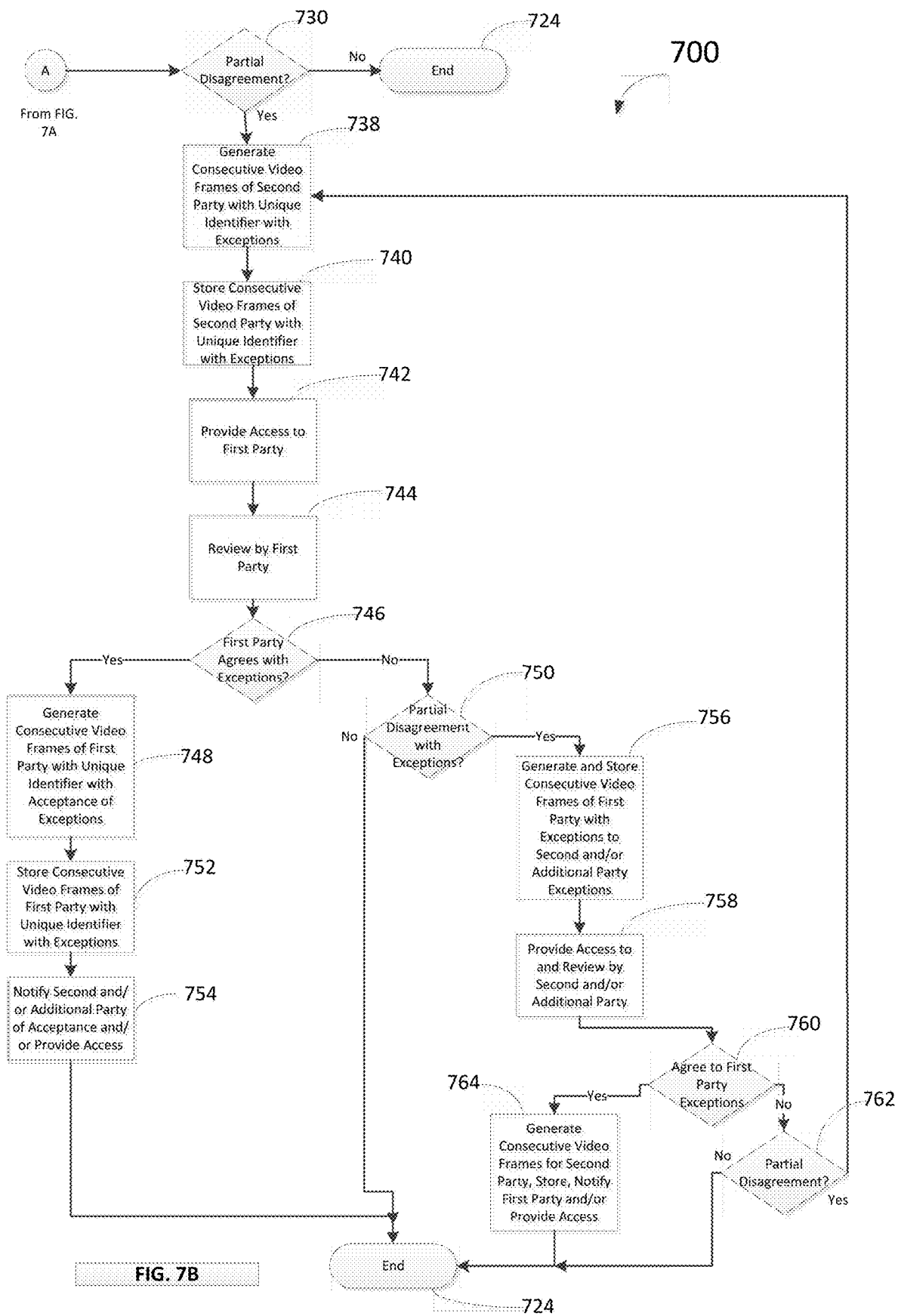
FIG. 7B illustrates the continuation of the video signature method of FIG. 7B according to an exemplary embodiment of the present invention.

Now referring to FIG. 7B, which illustrates method 700 as continued from A of FIG. 7A, at decision block 730, it is determined whether user/party 110 has a partial disagreement with the terms of the agreement document. If there is no partial disagreement, execution of method 700 proceeds to end block 724.

At block 738, if user/party 110 has a partial disagreement with the terms of the agreement document as received from user/party 106, user/party 1110 can simply generate consecutive video frames of her with the unique identifier and with whatever exceptions that she disagrees with. For example, if she disagrees with paragraph 5, she can verbalize her agreement with the document by verbalizing the unique identifier but then stating that she disagrees with paragraph 5 for example. She may also state her specific disagreements in the paragraph which are also captured as consecutive video frames that can be reviewed by user/party 106.

At block 740, the consecutive video frames captured by user/party 110 are stored with the unique identifier and with exceptions.

At 742, user/party 106 is provided with access to the agreement document including the consecutive video frames recorded with exception by user/party 1110.

At block 744, user/party 106 reviews the exceptions and any specific comments regarding the exceptions to see if she agrees with those exceptions.

At decision block 746, if user/party 106 agrees with the comments, execution of method 700 proceeds to block 748, and if she disagrees with the exceptions, execution of method 700 proceeds to block 750.

At block 748, user/party 106 agrees with the exceptions and thus, consecutive video frames of user/party 106 are captured as user/party 106 verbalizes acceptance of the unique identifier with whatever exceptions were stated by user/party 110.

At block 752, the consecutive video frames are stored with the unique identifier with exceptions. At block 754, user/party 110 is notified that user/party 106 has accepted the agreement with exceptions or access can be provided to user/party 110 to access the consecutive video files as captured by user/party 106 accepting the terms of the document with exceptions. Thereafter, execution proceeds to end block 724.

Returning to decision block 750, if user/party 106 has no partial disagreement with exceptions, execution of method 700 is terminated and proceeds to end block 724.

On the other hand, if user/party 106 has a partial disagreement with the exceptions, at block 756, consecutive video frames of user/party 106 with exceptions to the exceptions by user/party 110 are generated and stored.

At block 758, method 700 provides access to and review by user/party 110.

At decision block 760, if user/party 110 agrees to the exceptions by user/party 106, execution proceeds to block 762 where consecutive video frames for user/party 110 are generated and then stored. Notification of user/party 106 or access is provided to user/party 106 to view the consecutive video frames forming the basis of the assent to the agreement.

At decision block 760, if user/party 110 does not agree with user/party 106's exceptions, execution proceeds to decision block 762. At decision block 762, if user/party 110 has no partial disagreement, execution proceeds to end block 724. However, at decision block 762, if there is a partial disagreement with user/party 106's exception, method 700 proceeds back to block 738.

At decision block 760, if user/party 110 agrees with user/party 106's exceptions, execution proceeds to block 764 where consecutive video frames for user/party 110, are stored, and user/party 110 is either notified or access to the stored consecutive video frames for user/party 110 is granted.

Figure 8A:
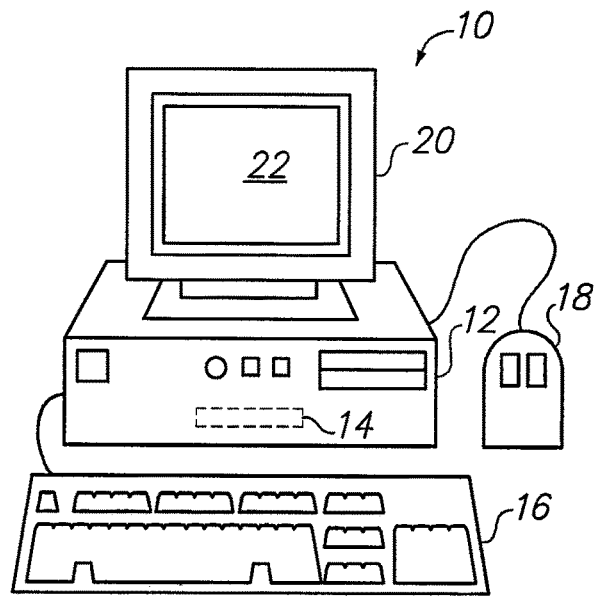
FIG. 8A shows a typical computer such as would be operated by a user on the Internet.

FIG. 8A shows a typical computer 10 such as would be operated by a user on the Internet. Computer 10 includes a cabinet 12 housing familiar computer components such as a processor, memory, disk drive, Compact Digital Read Only Memory (CDROM), etc. (not shown). User input devices include keyboard 16 and mouse 18. Output devices include display 20 having a display screen 22. Naturally, many other configurations of a computer system are possible. Some computer systems may have additional components to those shown in FIG. 8A while others will have fewer components. For example, server computers need not have attached input and output devices since they may only be accessed from time to time by other computers over a network. Human interaction with such a server computer can be at another computer that is equipped with input and output devices. Input and output devices exist in many variations from those shown in FIG. 8A. Displays can be liquid crystal displays (LCD), computer monitors, plasma, etc. Input devices can include a trackball, digitizing tablet, microphone, etc. In general, use of the term "input device" is intended to include all possible types of devices and ways to input information into a computer system or onto a network. Likewise the term "output device" includes all possible types of devices and ways to output information from a computer system to a human or to another machine.

The computer itself can be of varying types including laptop, notebook, palm-top, pen-top, etc. The computer may not resemble the computer of FIG. 8A as in the case where a processor is embedded into another device or appliance such as an automobile or a cellular telephone. Because of the ever-changing nature of computers and networks, the description of hardware in this specification is intended only by way of example for the purpose of illustrating the preferred embodiment. Any distributed networked system capable of executing programmed instructions is suitable for use with the present invention.

Figure 8B:
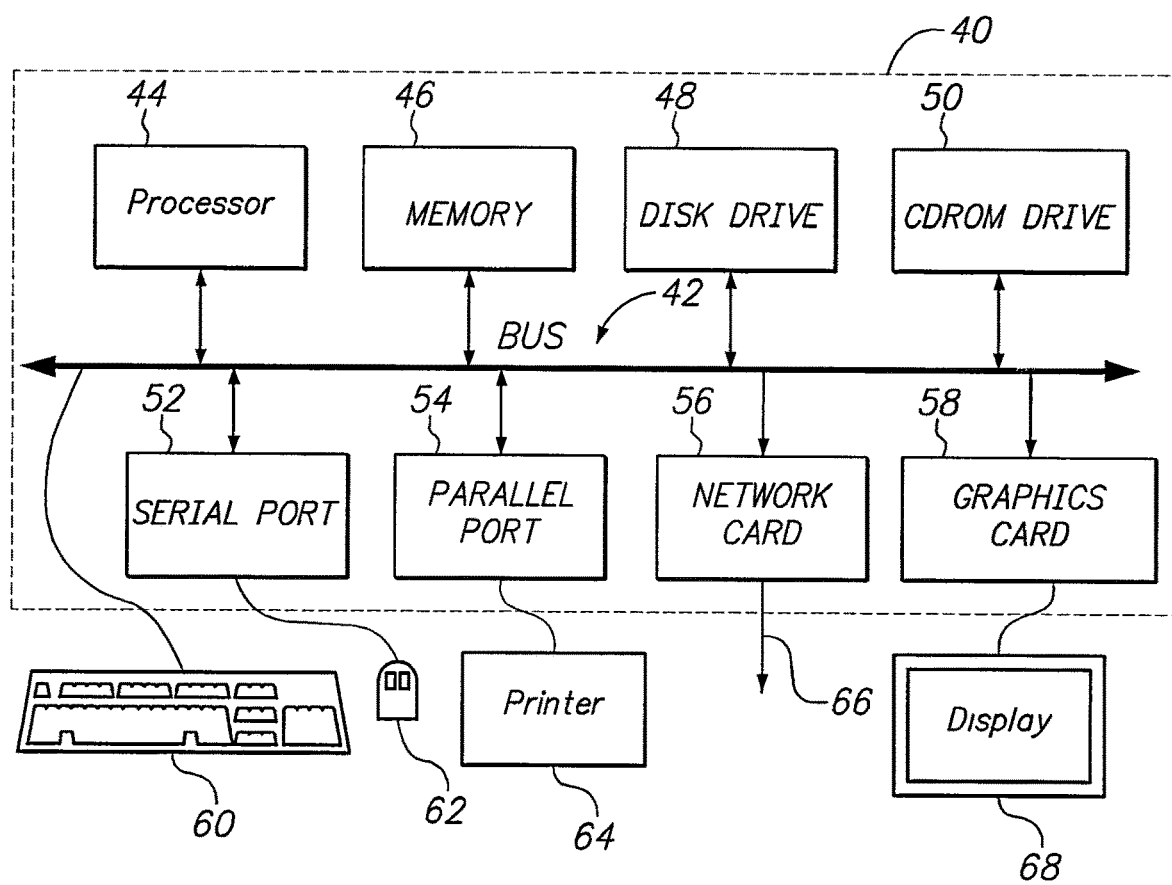
FIG. 8B shows subsystems of the computer of FIG. 8A.

FIG. 8B shows subsystems of the computer of FIG. 8A. In FIG. 8B, subsystems within box 40 are internal to, for example, the cabinet 12 of FIG. 8A. Bus 42 is used to transfer information in the form of digital data between processor 44, memory 46, disk drive 48, CDROM drive 50, serial port 52, parallel port 54, network card 56 and graphics card 58. Many other subsystems may be included in an arbitrary computer system and some of the subsystems shown in FIG. 8B may be omitted. External devices can connect to the computer system's bus (or another bus or line, not shown) to exchange information with the subsystems in box 40. For example, devices such as keyboard 60 can communicate with processor 44 via dedicated ports and drivers (shown symbolically as a direct connection to bus 42). Mouse 62 is connected to serial port 52. Devices such as printer 64 can connect through parallel port 54. Network card 56 can connect the computer system to a network. Display 68 is updated via graphics card 58. Again, many configurations of subsystems and external devices are possible.

While the above is a complete description of exemplary specific embodiments of the invention, additional embodiments are also possible. Thus, the above description should not be taken as limiting the scope of the invention, which is defined by the appended claims along with their full scope of equivalents.

I claim:

1. A method comprising:
providing a user computing device with a processor:
using said processor to receive a data file configured to display plain text and/or images, the data file having one or more predetermined areas wherein a signature of a signer that is using said user computing device can be appended;
using captured video frames of the signer to digitally sign one or more predetermined areas of the data file by
using the processor to initiate a video capture device on the user computing device, generating a unique identifier of the data file;
using the video capture device to capture a plurality of video frames of the signer verbalizing the uniquely associated identifier;
using the processor to store, in memory, the data file and the plurality of video frames, and associating said plurality of video frames with said one or more of the predetermined areas of the data file, wherein selection of at least one said predetermined areas of the data file initiates a video player that plays back the plurality of captured video frames to authenticate the signer's verbalizing the uniquely associated identifier of the data file.

2. The method of claim 1 wherein said data file is a document and wherein said using the video capture device to capture a plurality of video frames of the signer verbalizing the uniquely associated identifier is acceptance of terms the document is for no more than a predetermined duration.

3. The method of claim 1 further comprising generating for storage on a server, the identifier, the plurality of the video frames and a name of the signer.

4. A computer program product including a non-transitory computer readable storage medium having executable code, the code when executed by a processor is adapted for performing the following:
receive a data file configured to display plain text and/or images, wherein the data file includes at least one predetermined areas wherein a signature of a signer that is using a computing device can be appended;
use captured video frames of the signer to digitally sign one or more predetermined areas of the data file by initiating a video capture device on the computing device,
use the video capture device to capture a plurality of video frames of the signer verbalizing a generated identifier uniquely associated with the data file, store, in memory, the data file and the plurality of video frames, and associating said plurality of video frames with said one or more of the predetermined areas of the data file, wherein selection of at least one said predetermined areas of the data file initiates a video player that plays back the plurality of captured video frames to authenticate the signer's.

5. The computer program product of claim 4 wherein the code is adapted to: use the video capture device to capture a plurality of video frames of the signer verbalizing the uniquely associated identifier for no more than a predetermined duration.

6. The computer program product of claim 4 wherein the code is adapted to: generate for storage on a server, the identifier, the plurality of the video frames and a name of the signer.

7. A system comprising: a video player;
a video capture device; an identifier generation engine;
a processor of a user computing device;
wherein the processor receives a data file configured to display plain text and/or images, the data file having one or more predetermined areas wherein a signature of a signer that is using said user computing device can be appended;
wherein the identifier generation engine generates a unique identifier of the data file;

wherein captured video frames of the signer are configured to digitally sign one or more predetermined areas of the data file by the processor initiating the video capture device on the user computing device, wherein the video capture device captures a plurality of video frames of the signer verbalizing the uniquely associated identifier of the data file;

wherein the processor stores, in memory, the data file and the plurality of video frames, and wherein the processor associates said plurality of video frames and signer verbalizing said uniquely associated identifier with the one or more of the predetermined areas of the data file, wherein selection of at least one said predetermined areas of the data file initiates the video player that plays back the plurality of captured video frames to authenticate the signer's verbalizing of said uniquely associated identifier.

8. The system of claim 7 wherein the video capture device captures the plurality of video frames for no more than a predetermined duration.

9. The system of claim 7 further comprising a server, wherein said server is configured to generate and store the uniquely associated identifier that includes the plurality of the video frames and a name of the signer.

10. The system of claim 7 further comprising a graphical user interface having a Start Record interface proximate to the one said predetermined area.

11. The system of claim 10 wherein the graphical user interface is configured to display the uniquely associated identifier after the Start Record interface is selected.

12. The system of claim 7 further comprising a playback thumbnail embedded in the at least one predetermined area.

13. The system of claim 12 wherein selection of said playback thumbnail initiates the video player to playback the plurality of video frames of said signer verbalizing said uniquely associated identifier.

14. The system of claim 7 wherein the data file is embedded with at least two sets of plurality of video frames, a first set of video frames for a first signer and a second set of video frames for a second signer.

15. The system of claim 7 further comprising a second video capture device for a second signer.

16. The system claim 7 further comprising a server, wherein the identifier generation engine is located on said server to generate uniquely associated identifier.

\* \* \* \* \*